W. J. NEWMAN.
SCRAPER OR LIKE DEVICE AND MEANS FOR MANIPULATING THE SAME.
APPLICATION FILED DEC. 8, 1913.

1,203,037.

Patented Oct. 31, 1916.

3 SHEETS—SHEET 1.

WITNESSES:
H. M. Gillespie.
J. B. Lagorio.

INVENTOR.
William J. Newman
BY Barnett & Lueman
ATTORNEY.

W. J. NEWMAN.
SCRAPER OR LIKE DEVICE AND MEANS FOR MANIPULATING THE SAME.
APPLICATION FILED DEC. 8, 1913.

1,203,037.

Patented Oct. 31, 1916.

3 SHEETS—SHEET 2.

WITNESSES:
H. M. Gillespie
J. B. Lagorio

INVENTOR.
William J. Newman
BY Barnett & Truman
ATTORNEY.

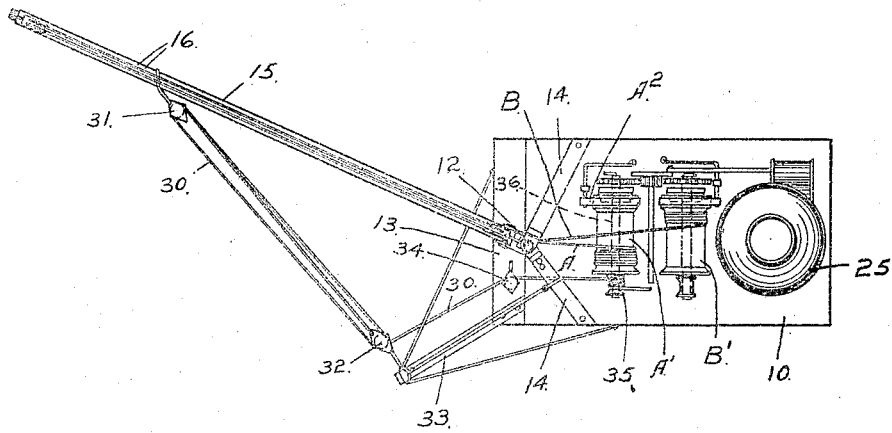
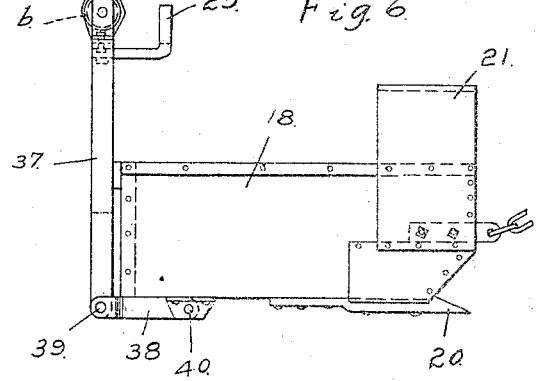
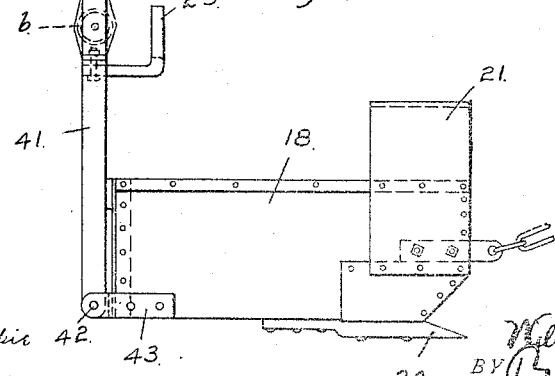

UNITED STATES PATENT OFFICE.

WILLIAM J. NEWMAN, OF CHICAGO, ILLINOIS.

SCRAPER OR LIKE DEVICE AND MEANS FOR MANIPULATING THE SAME.

1,203,037.   Specification of Letters Patent.   Patented Oct. 31, 1916.

Application filed December 8, 1913. Serial No. 805,323.

*To all whom it may concern:*

Be it known that I, WILLIAM J. NEWMAN, a citizen of the United States, residing at Chicago, in the county of Cook and State of Illinois, have invented certain new and useful Improvements in Scrapers or like Devices and Means for Manipulating the Same, of which the following is a specification.

My invention relates to a scraper for filling or excavating operations and means for manipulating and controlling the movements of the same.

The principal objects of the invention are: to provide an apparatus of this sort in which the movements and operations of the scraper, or other like device, may be conveniently, quickly and accurately controlled by the operator so as to adapt the apparatus to the particular conditions which it has to meet; to provide an arrangement whereby the contents of the scraper may be completely discharged, even when consisting of sticky material such as clay for example, and may be discharged at such point as the operator may desire; and finally, to provide an apparatus which will be relatively simple, economical to construct and capable of being operated rapidly and accurately by a smaller gang of men than is commonly employed in work of this character.

The invention has for further objects the other new and improved constructions, arrangements and devices in excavating and filling apparatus to be hereinafter described and claimed.

The invention is illustrated, in a preferred embodiment, in the accompanying drawings wherein—

Figure 1:
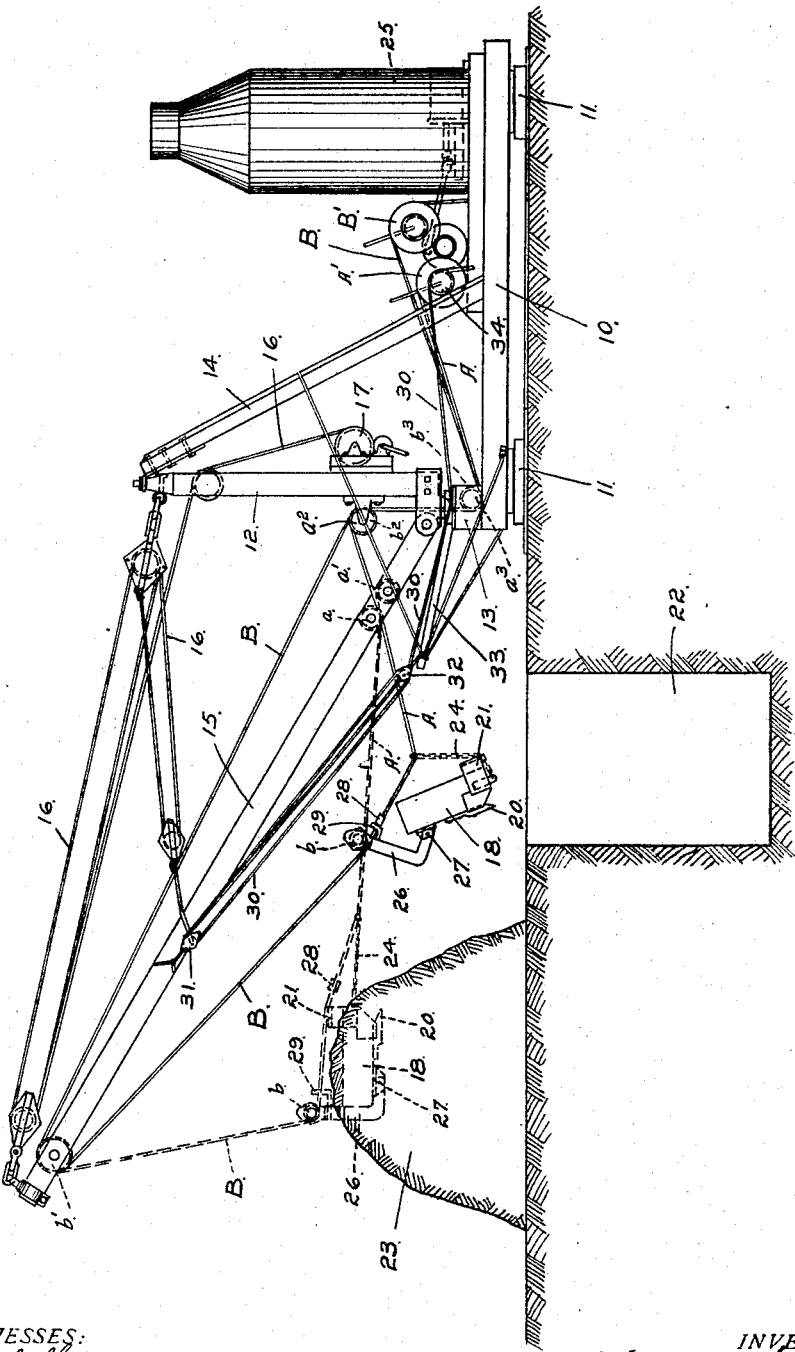
Figure 2:
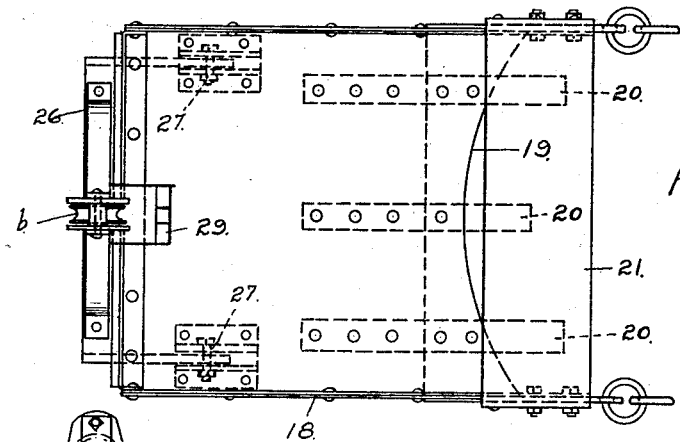
Figure 3:
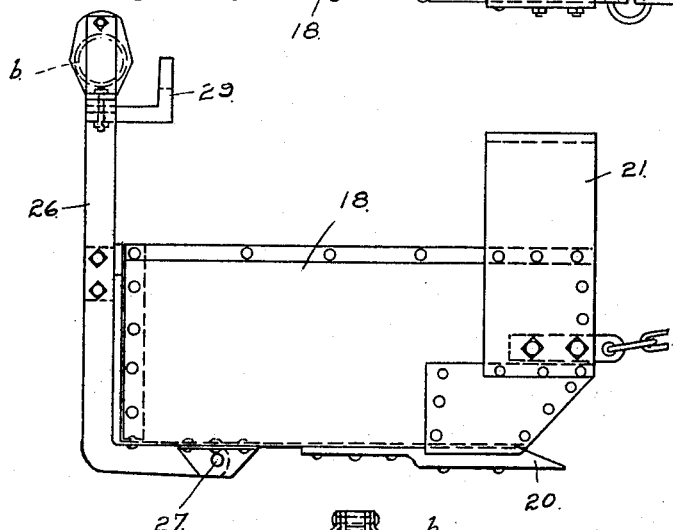
Figure 4:
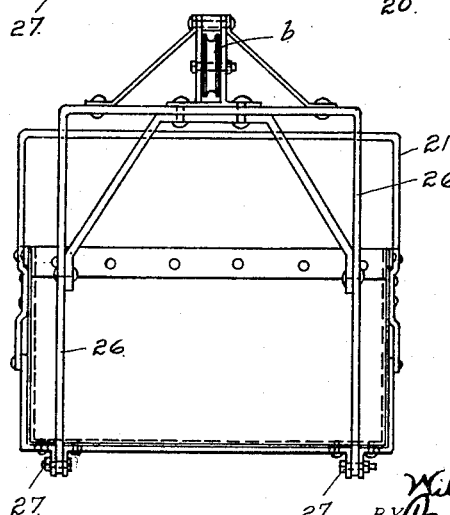

Figure 1 shows, in side elevation, a scraper and means for manipulating the same constructed and arranged in accordance with the invention; Fig. 2, a plan view of the scraper; Figs. 3 and 4, side and end views thereof, respectively; Fig. 5, a plan view of the apparatus; Fig. 6, a side elevation of the scraper showing a modified form of supporting element, and Fig. 7 a similar view showing another modification.

Like characters of reference designate like parts in the several figures of the drawings.

Referring to the drawings, 10 designates a platform shown as movably supported on rollers 11.

12 designates a mast revolubly mounted in a standard 13 on platform 10 and supported at its upper end by a strut 14.

15 designates a boom pivoted to the mast 12. The boom is raised and lowered by a cable 16 and winch 17, these parts being of familiar construction and not requiring detailed description. Any suitable supporting structure for the scraper, its operating cables and sheaves, might be employed instead of the structure shown.

The scraper, in its preferred form (Figs. 1 to 4 inclusive) is designated 18. Its cutting edge is preferably curved, as indicated at 19, and provided with teeth 20. The forward end of the scraper is preferably reinforced by the arched band of metal 21. The design and construction of the scraper may, however, be varied without departure from the invention.

My invention resides particularly in certain devices and arrangements for supporting and manipulating the scraper. In the particular form of apparatus shown in the drawings, the function of the scraper is to re-fill a trench, designated 22, with the previously excavated earth 23 piled up along side of the trench. The scraper is first caused to dig into the pile of earth 23, is then transported in substantially horizontal position to a point above the trench, and is thereupon tilted or allowed to tilt into a vertical position, or an oblique position approaching the vertical, so as to discharge its contents into the trench. It is then returned to a digging position on or behind the pile of earth 23. The arrangements are such that these movements are under the control of a single operator who may vary them as occasion requires. Furthermore, the tilting movement can, if necessary, be made very sudden and in rapid succession so as to insure the complete discharge of the contents of the scraper. This is important when the material handled is sticky material like clay or heavy loam, as the series of rapid tilting movements and the jar necessarily caused during such movements by the rear edge of the scraper striking the support 26 will loosen any material that may adhere to the sides and bottom of the scraper. The devices and arrangements for accomplishing these movements and for conveniently and accurately controlling the same are preferably as follows: A designates a cable which is secured to the forward end of the scraper, for example, to the chain bail 24 with which the scraper is preferably provided. The cable A extends between a pair of sheaves $a$, $a'$ on the boom 15 over a sheave $a^2$ on the mast 12 and a sheave $a^3$ mounted on the platform 10 and is wound upon a winding drum $A'$. This winding drum, which is preferably of the common friction type and is shown diagrammatically, is operated by an engine 25. The drum, as well known to those familiar with this type of machinery, may be revolved so as to wind up the cable A or, if desired, may be held stationary by the band brake $A^2$, for instance, which is commonly used on apparatus of this character and need not be particularly described. The weight of the bucket will unwind the cable when the brake is released. B designates another cable which is also attached to the flexible bail 24 of the scraper and extends under a sheave $b$ on a supporting element 26 on which the rear end of the scraper is pivotally mounted. Preferably the supporting element 26 consists of an angular frame extending under the bottom of the scraper and pivoted thereto at points 27 which are removed from the back edge of the scraper but are back of its center of gravity when loaded. The cable B passes around the sheave $b'$ on boom 15 and over sheaves $b^2$, $b^3$ arranged on the same axes with the sheaves $a^2$, $a^3$, and is wound upon a drum $B'$ similar in construction to the drum $A'$ and similarly operated. Preferably the cable B is provided with a stop 28 adapted to abut against a stop member 29 on the supporting element 26 when the scraper is dumped. The boom 15 is swung on its pivotal mount by a rope 30 extending around the double sheaves of a fall block 31 attached to the boom, and a fall block 32 attached to an outrigger 33 secured to the platform 10. The cable then passes around the single sheave of a fall block 34 on the platform and is given several turns around the nigger head 35 of the engine which is shown as located on the shaft 36 on which the winding drum $A'$ is loosely mounted.

In Fig. 6 I have shown a modified form of supporting element for the back of the scraper, this element consisting of two elements 37, 38, hinged together at 39, the member 38 being pivoted to the bottom of the scraper at 40.

Another modified construction is shown in Fig. 7. The supporting element consists of a frame 41 pivoted at 42 to strips 43 secured to the back of the scraper. I prefer, however, to pivot the supporting element to the under side of the scraper at points forward of the rear edge of the scraper as shown in Figs. 3 and 6 in order to give the scraper a tilt more nearly approximating the vertical during the dumping operation.

The operation of the apparatus above described is as follows: The scraper is caused to dig into the pile of earth 23 by winding up the cable A and, if necessary, paying out cable B, the latter depending upon the position which the scraper takes with respect to the material into which it digs. The dotted lines in Fig. 1 illustrate the relation of the parts during the digging operation. After the scraper has been filled it is transported to a point over the trench by winding up cable A and paying out the cable B. This operation, which is entirely within the control of the operator manipulating winding drums $A'$, $B'$, is carried on so as to keep the scraper in substantially horizontal position in order that the load may not be spilled. This substantially horizontal position is maintained by placing the supporting element 26 across the back of the scraper so that contact between the rear end of the scraper and the support will prevent the cable engaging end of the supporting element from passing forward of the back web of the scraper. When the scraper has reached the proper discharging point, with respect to the trench 22, for example, the operator holds cable A and quickly pulls up on cable B. The gravity of the load throws the scraper into the position shown in the full lines in Fig. 1, that is, the scraper tilts on its pivot points 27 until stop 28 comes into contact with stop 29 and if need be, until the bail 24 is folded back over the scraper. This movement acts upon the load in the scraper with great force tending to throw it out. If the material is of sticky character and the entire contents is not discharged in the first operation the scraper may be pulled back into horizontal position and then dropped again by a proper manipulation of cable A. The scraper is returned to the digging position by winding in cable B and paying out cable A. As a matter of fact the cables A and B are, in effect, a single cable since, in the construction shown, they are attached to the bail of the scraper at the same point. For the purpose of claiming the invention it is more convenient to regard them as separate cables.

By the term "cable" it will be understood that I intend not only a rope but any suitable chain, wire or other equivalent means. By referring to the scraper as being held in substantially horizontal position during the period of transportation I intend such position as will prevent the spilling of the load in transit. It should also be understood that by the term "scraper" I intend any suitable device for handling earth and other like material in the manner substantially as described. While the controlling apparatus is of particular utility for the manipulation of a device which digs or scrapes the earth the same apparatus might be employed with an element designed simply for the transportation of material.

The operation of the scraper may be made to cover considerable distance lengthwise of the trench without moving the entire apparatus by swinging the boom through the manipulation of rope 30. The operation of the scraper is a little different for each angular position of the boom but this causes no trouble because with my apparatus for manipulating the scraper its movements can be accurately controlled by means of the cables A, B.

It will be seen that the apparatus is very flexible in its operation so that it may be used in a large variety of different situations. Every movement of the scraper is under control and may be varied to suit various requirements of use. Furthermore, the apparatus may be controlled by a single operator. All of the movements of the scraper may be directed by the manipulation of cables A and B.

While I have described my invention in certain preferred embodiments, it will be understood that modifications might be made without departing from the principles of the invention. Therefore I do not wish to be understood as limiting the invention to the particulars described and claimed except so far as the same are made specific limitations on certain of the appended claims.

I claim:

1. In apparatus of the character described, the combination with a scraper, of a supporting element pivoted to the bottom of the scraper which engages the scraper to prevent backward tilting thereof, a pair of cables for manipulating said scraper, and means for attaching said cables to the forward end of the scraper, one of said cables extending through and movably sustaining said supporting element.

2. In apparatus of the character described, the combination with a scraper, of a supporting element pivoted to the bottom of the scraper which engages the scraper to prevent backward tilting thereof, a pair of cables for manipulating said scraper, and means for attaching said cables to the forward end of the scraper, one of said cables extending through and movably sustaining said supporting element, and being provided with a stop adapted to abut against said element.

3. In apparatus of the character described, the combination with a scraper, of a supporting element pivoted to the bottom of the scraper which engages the scraper to prevent backward tilting thereof, a pair of cables, means for attaching said cables to the forward end of the scraper, one of said cables extending through and movably sustaining said supporting element, and separate winding drums for said cables.

4. In apparatus of the character described, the combination with a scraper provided at the forward end with a flexible bail, of a supporting element pivoted to the bottom of the scraper which engages the scraper to prevent backward tilting thereof, and a pair of cables for manipulating said scraper which are attached to said bail, one of said cables extending through and movably sustaining said supporting element.

5. In apparatus of the character described, the combination with a scraper provided at the forward end with a bail, of a supporting element pivoted to the bottom of the scraper which engages the scraper to prevent backward tilting thereof, and a pair of cables for manipulating said scraper which are attached to said bail, one of said cables extending through and movably sustaining said supporting element.

6. In apparatus of the character described, the combination with a scraper, of a supporting element to which the bottom of the scraper is pivoted at points between its rear end and its center of gravity when loaded which engages the scraper to prevent backward tilting thereof, and a pair of cables for manipulating said scraper which are attached to the forward end of the scraper, one of said cables extending through and movably sustaining said supporting element.

7. In apparatus of the character described, the combination with a scraper, of an angular supporting element extending around the rear end of the scraper and pivoted to the bottom thereof at points between the rear end of the scraper and its center of gravity when loaded, and a pair of cables for manipulating said scraper which are attached to the forward end of the scraper, one of said cables extending through and movably sustaining said supporting element.

8. In apparatus of the character described, the combination with a scraper, of a bail at the forward end of the scraper, a supporting element to which the rear end of the bottom of the scraper is pivoted which engages the scraper to prevent backward tilting thereof, and a pair of cables for manipulating said scraper which are attached to said bail, one of which passes through and movably sustains said supporting element and is provided at a distance from the point of attachment to the bail with a stop adapted to abut against said supporting element when the scraper is dumped.

9. In apparatus of the character described, the combination with a scraper, of a bail at the forward end of the scraper, a supporting element having a pivoted relation with the bottom of the scraper at points between the rear end of the scraper and its center of gravity when loaded which engages the scraper to prevent backward tilting thereof, and a pair of cables for manipulating said scraper which are attached to said bail, one of which passes through and movably sustains said supporting element and is provided at a distance from the point of attachment to the bail with a stop adapted to abut against said supporting element when the scraper is dumped.

10. In apparatus of the character described, the combination with a scraper provided at its forward end with a bail, of an angular supporting element which extends around the rear end of the scraper and is pivoted thereto at points between the rear end of the scraper and its center of gravity when loaded, a pair of cables secured to said bail, one of which extends through and movably sustains said supporting element and is provided with a stop at a distance from the point of attachment of said cable to the bail which is adapted to abut against said supporting element when the scraper is dumped, and separate winding drums for said cables.

11. In apparatus of the character described, the combination with a scraper provided at the forward end with a flexible bail, of an angular supporting element which extends around the rear end of said scraper and is pivoted to the bottom thereof at points between the rear end of the scraper and its center of gravity when loaded, a sheave mounted on the upper end of said supporting element, a pair of cables secured to said bail, one of said cables extending under said sheave and provided with a stop adapted to abut against said supporting element, and separate winding drums for said cables.

12. In apparatus of the character described, the combination with a sustaining structure, of a scraper, a pair of cables, means for attaching said cables to the forward end of said scraper, a supporting element to which the rear end of the bottom of said scraper is pivoted which engages the scraper to prevent backward tilting thereof, and a pair of sheaves on said sustaining structure oppositely disposed with respect to the travel of the scraper, one of said cables extending over one of said pair of sheaves, the other cable extending through said supporting element and over the other of said pair of sheaves.

13. In apparatus of the character described, the combination with a sustaining structure, of a scraper, a pair of cables, means for attaching said cables to the forward end of said scraper, a supporting element to which the rear end of the bottom of said scraper is pivoted which engages the scraper to prevent backward tilting thereof, a pair of sheaves on said sustaining structure oppositely disposed with respect to the travel of the scraper, one of said cables extending over one of said pair of sheaves, the other cable extending through said supporting element and over the other of said pair of sheaves, and separate winding drums for said cables.

14. In apparatus of the character described, the combination with a boom provided at each end with a sheave, of a pair of separately operable winding drums, a pair of cables extending around said sheaves respectively, and adapted to be wound upon said winding drums, a scraper, means for securing said cables to the forward end of the scraper, and a supporting element through which one of said cables extends, to which the rear end of the bottom of said scraper is pivoted which engages the scraper to prevent backward tilting thereof.

15. In apparatus of the character described, the combination with a boom provided at each end with a sheave, of a pair of separately operable winding drums, a pair of cables adapted to be wound on said drums respectively, and extending one over each of said sheaves, a scraper having a bail at its forward end to which said cables are attached, an angular supporting element pivoted to the rear end of the bottom of the scraper at points between the back of the scraper and its center of gravity when loaded, a sheave on said supporting element which bears on one of said cables and a stop secured to said last named cable adapted to abut against said supporting element when the scraper is dumped.

16. A device for handling earth, and the like, comprising a scraper, a bail attached to the forward end of said scraper, and an angular frame extending around the back of said scraper and pivoted to the bottom thereof at points between the back of the scraper and its center of gravity when loaded.

WILLIAM J. NEWMAN.

Witnesses:
G. Y. SKINNER,
L. A. FALKENBERG.

Copies of this patent may be obtained for five cents each, by addressing the "Commissioner of Patents, Washington, D. C."